United States Patent
Ikeda

(10) Patent No.: US 8,392,974 B2
(45) Date of Patent: Mar. 5, 2013

(54) INFORMATION PROCESSING SYSTEM AND PROCESSING METHOD THEREOF

(75) Inventor: Motoki Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 12/709,329

(22) Filed: Feb. 19, 2010

(65) Prior Publication Data

US 2010/0235904 A1 Sep. 16, 2010

(30) Foreign Application Priority Data

Mar. 16, 2009 (JP) ................................. 2009-063229

(51) Int. Cl.
G06F 21/00 (2006.01)
G06F 7/04 (2006.01)
(52) U.S. Cl. ........................................... 726/5; 713/183
(58) Field of Classification Search ........................ None
See application file for complete search history.

(56) References Cited

U.S. PATENT DOCUMENTS

| 7,107,615 | B2 * | 9/2006 | Cossel et al. | 726/16 |
|---|---|---|---|---|
| 7,367,044 | B2 * | 4/2008 | Fowler et al. | 726/1 |
| 7,478,407 | B2 * | 1/2009 | Jain et al. | 719/328 |
| 7,631,346 | B2 * | 12/2009 | Hinton et al. | 726/8 |
| 8,060,930 | B2 * | 11/2011 | Lovat et al. | 726/19 |
| 2004/0010607 | A1 * | 1/2004 | Lee et al. | 709/229 |
| 2004/0088560 | A1 * | 5/2004 | Danks | 713/200 |
| 2006/0069918 | A1 | 3/2006 | Takahashi et al. | |
| 2007/0107042 | A1 * | 5/2007 | Corona | 726/2 |
| 2007/0245153 | A1 * | 10/2007 | Richtsmeier et al. | 713/186 |
| 2008/0231887 | A1 | 9/2008 | Sakagami et al. | |
| 2009/0002742 | A1 * | 1/2009 | Kasatani | 358/1.13 |
| 2009/0019524 | A1 * | 1/2009 | Fowler et al. | 726/3 |
| 2009/0070581 | A1 | 3/2009 | Shahindoust et al. | |
| 2009/0210928 | A1 * | 8/2009 | Ourega | 726/4 |

FOREIGN PATENT DOCUMENTS

JP 2006-102948 A 4/2006

OTHER PUBLICATIONS

U.S. Appl. No. 12/714,232, filed Feb. 26, 2010.
Office Action dated Jul. 11, 2012 in U.S. Appl. No. 12/714,232.

* cited by examiner

*Primary Examiner* — Hadi Armouche
*Assistant Examiner* — Jaron K Brunner
(74) *Attorney, Agent, or Firm* — Fitzpatrick, Cella, Harper & Scinto

(57) ABSTRACT

When a plurality of information processing apparatuses that have an authentication function cooperate to execute a job, user authentication information is transmitted from a cooperative information source processing apparatus to a destination cooperative information processing apparatus that execute the cooperative job. A user account is created at the destination cooperative information processing apparatus based on the transmitted authentication information. When the cooperative information source processing apparatus notifies execution of a cooperative job to the destination cooperative information processing apparatus, authentication information that is authenticated at the cooperative information source processing apparatus is transmitted to the destination cooperative information processing apparatus. The destination cooperative information processing apparatus creates a user account based on the authentication information, and executes the cooperative job using the created user account.

6 Claims, 13 Drawing Sheets

FIG. 11

| USER ID | PASSWORD | CLASSIFICATION |
|---------|----------|----------------|
| sato | doubutu | 0 |
| suzuki | sakana | 0 |
| ikeda | hana | 1 |
| ~ | | |
| yamada | kusa | 0 |
| tanaka | kaiju | 1 |
| ito | ningen | 0 |

FIG. 15

|  | 1502 | 1503 | 1504 | 1505 | 1506 |
|---|---|---|---|---|---|
|  | ACCEPTANCE NUMBER | STATUS | COMPLETION DATE AND TIME | DESTINATION | OWNER |
| 1501 | 2801 | OK | 2007/01/30 20:27:15 | 03XXXXXXXX | suzuki |
|  | 2802 | OK | 2007/01/31 19:57:01 | 03XXXXXXXX | ito |
|  | 2885 | NG | 2007/02/05 08:55:58 | 045XXXXXXX | suzuki |
|  | ~ | | | | |
|  | 8799 | OK | 2007/10/09 09:04:23 | 03XXXXXXXX | ikeda |
|  | 8800 | OK | 2007/10/09 15:23:30 | 06XXXXXXXX | yamada |

FIG. 16

|  | 1102 | 1103 | 1104 | 1602 |
|---|---|---|---|---|
|  | USER ID | PASSWORD | CLASSIFICATION | LAST JOB |
|  | sato | doubutu | 0 | COPY_4001 |
|  | suzuki | sakana | 0 | FAX_8790 |
| 1601 | ikeda | hana | 1 | FAX_8799 |
|  | ~ | | | |
|  | yamada | kusa | 0 | FAX_8800 |
|  | tanaka | kaiju | 1 | COPY_4003 |
|  | ito | ningen | 0 | COPY_4002 |

| | USER ID | COPY USE AUTHORIZATION | FAX USE AUTHORIZATION | PRINT USE AUTHORIZATION |
|---|---|---|---|---|
| | sato | 0 | 0 | 0 |
| | suzuki | 0 | 0 | 0 |
| 1801 | ikeda | 2 | 0 | 0 |
| | ~ | | | |
| | yamada | 0 | 0 | 0 |
| | tanaka | 0 | 0 | 0 |
| | ito | 0 | 2 | 2 |

INFORMATION PROCESSING SYSTEM AND PROCESSING METHOD THEREOF

BACKGROUND OF THE INVENTION

1. Field of the Invention

The present invention relates to an information processing system that executes a cooperative job that is executed by cooperation between a plurality of information processing apparatuses that have an authentication function, as well as a processing method thereof.

2. Description of the Related Art

In recent years, technology has been proposed that provides a user with a virtual multifunction information processing system in which a plurality of information processing apparatuses are connected to a network and the respective information processing apparatuses cooperate to execute processing.

For example, in an office or the like, an information processing apparatus (simple multifunction peripheral) that has only a print function and a copy function, and an information processing apparatus (multifunction peripheral) that additionally has a facsimile function are connected by a LAN. With this configuration, an original can be scanned using a scanner of the simple multifunction peripheral to create a document. Subsequently, the created document is sent to the multifunction peripheral and the multifunction peripheral transmits the received document as a facsimile.

Thus, by cooperation between a plurality of information processing apparatuses, a user can use a facsimile function of a remote multifunction peripheral from a simple multifunction peripheral that is located near the user's own seat. Thus, the convenience of the user can be improved.

Hereunder, an information processing apparatus at which a user performs a direct operation, such as the above described simple multifunction peripheral, is referred to as "cooperative information source processing apparatus". Further, an information processing apparatus, such as a multifunction peripheral, that cooperates with the cooperative information source processing apparatus is referred to as "destination cooperative information processing apparatus". Furthermore, execution of a function provided by cooperation between a cooperative information source processing apparatus and a destination cooperative information processing apparatus is referred to as a "cooperative job".

Nowadays, information processing apparatuses have an authentication function to enhance security. Some information processing apparatuses are configured so that a user cannot use the functions of the information processing apparatus or use or refer to information stored therein without performing an authentication operation.

However, in an environment in which a plurality of information processing apparatus cooperates as described above, it is necessary for the user to perform authentication at each of the information processing apparatuses. This situation is complicated and inconvenient for the user. In this regard, technology has been proposed that automatically executes processing by sending authentication information to a destination cooperative information processing apparatus when a user receives authentication at a cooperative information source processing apparatus (for example, see Japanese Patent Laid-Open No. 2006-102948).

However, according to Japanese Patent Laid-Open No. 2006-102948, if an account of a user that is authenticated at a cooperative information source processing apparatus does not exist at a destination cooperative information processing apparatus, authentication can not be performed at the destination cooperative information processing apparatus. Hence, the cooperative job cannot be executed at the destination cooperative information processing apparatus. In order to enable execution of the cooperative job it is necessary for an account of the user to be previously registered at the destination cooperative information processing apparatus also. However, in some cases this involves complications with respect to management.

For example, there are many cases in which a user normally uses a cooperative information source processing apparatus and rarely executes a cooperative job. Since it is necessary to register a user account at a destination cooperative information processing apparatus even in this case, this situation leads to an increase in management costs.

SUMMARY OF THE INVENTION

The present invention provides a method that enables execution of a cooperative job even when a user does not have an account at a destination cooperative information processing apparatus.

According to one aspect of the present invention, there is provided an information processing system that executes a cooperative job that is executed by cooperation between a plurality of information processing apparatuses that have an authentication function, wherein: a cooperative information source processing apparatus comprises: authentication means for performing authentication of a user using authentication information; and transmission means that, in a case where authentication of a user is performed by the authentication means using the authentication information for executing a cooperative job, transmits the authentication information used for the authentication to a destination cooperative information processing apparatus; and the destination cooperative information processing apparatus comprises: creation means that creates account information based on authentication information transmitted by the transmission means; and management means that performs management of the cooperative job using account information created by the creation means.

Further features of the present invention will become apparent from the following description of exemplary embodiments (with reference to the attached drawings).

BRIEF DESCRIPTION OF THE DRAWINGS

FIG. 11 is a view that illustrates the configuration of a user management table according to the first embodiment;

FIG. 15 is a view that illustrates the configuration of job history information of a FAX function that is stored in the storage 213 of the information processing apparatus 101;

FIG. 16 is a view that illustrates the configuration of a user information table according to a third embodiment;

DESCRIPTION OF THE EMBODIMENTS

Figure 1:
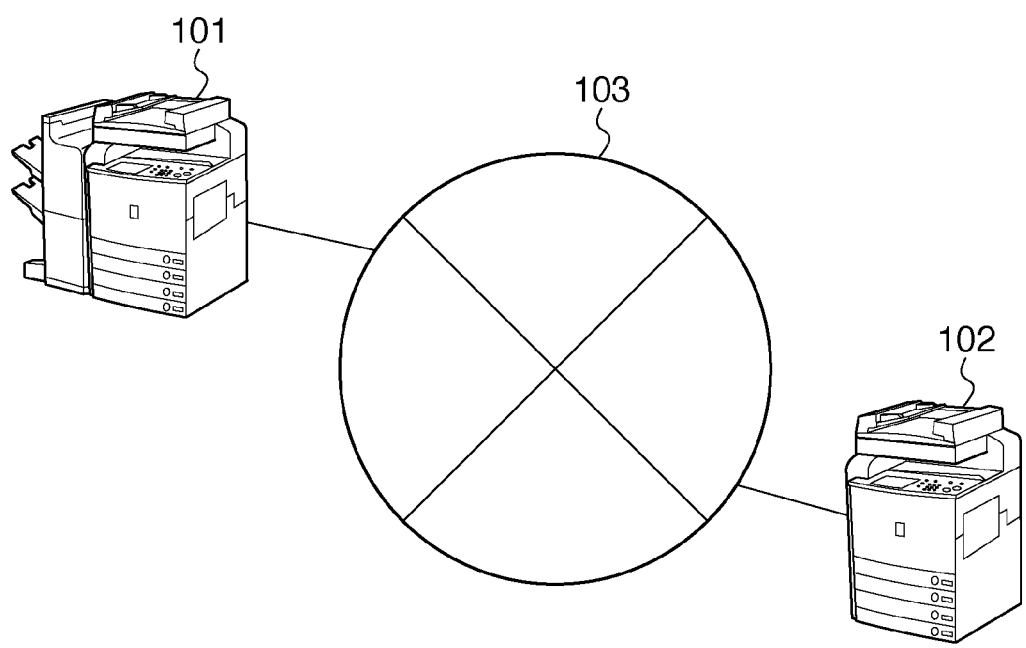
FIG. 1 is a view that illustrates the configuration of an information processing system according to a first embodiment.

Hereunder, best modes for carrying out the invention are described in detail while referring to the drawings.

[First Embodiment]

FIG. 1 is a view that illustrates the configuration of an information processing system according to the first embodiment. As shown in FIG. 1, an information processing system includes an information processing apparatus 101 and an information processing apparatus 102 that are connected via a network 103. In this case, the information processing apparatus 101 is a digital multifunction peripheral that has a FAX function in addition to a print function and a copy function. In contrast, the information processing apparatus 102 is a digital multifunction peripheral that has only a print function and a copy function.

The information processing apparatus 101 and information processing apparatus 102 have an authentication function and an authentication management function. Unless a user receives authentication and logs in, the user cannot use a print function, a copy function, or a FAX function or the like of the information processing apparatus 101 and information processing apparatus 102. That is, each of a plurality of information processing apparatuses manages authorization relating to use of the functions of its own apparatus for each item of account information (user account).

Figure 2:
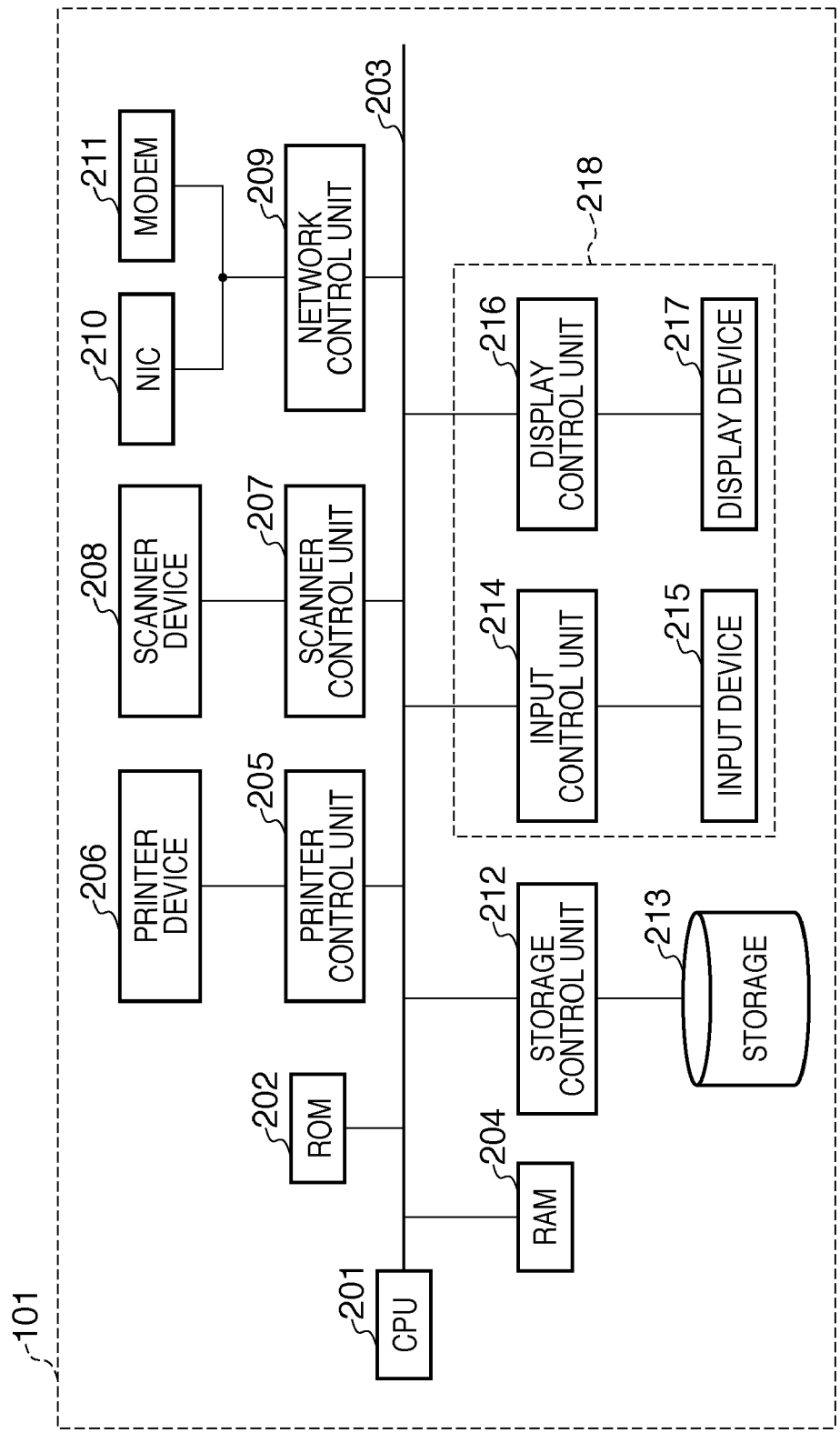
FIG. 2 is a block diagram that illustrates the configuration of an information processing apparatus according to the first embodiment.

FIG. 2 is a block diagram that illustrates the configuration of an information processing apparatus according to the first embodiment. In FIG. 2, a CPU 201 is a controller for controlling the entire information processing apparatus. The CPU 201 activates an OS (Operating System) by means of a boot program stored in a ROM 202. The CPU 201 executes a control program and various application programs stored in a storage 213 on the OS. The CPU 201 is connected to each unit by a system bus 203.

A RAM 204 functions as a main memory or a temporary storage region such as a work area of the CPU 201. The RAM 204 is also utilized as a temporary data storage region when performing conversion processing of image data or the like.

A printer control unit 205 controls a printer device 206 to print image data on a paper sheet or the like. The printer device 206 prints image data as an image on a paper sheet. Typical printing methods include an electrophotographic printing method using a photosensitive drum or a photosensitive belt or the like and an inkjet method that ejects ink from a minute nozzle array to print an image directly onto a paper sheet. However, the present invention is not limited thereto and any printing method may be used.

A scanner control unit 207 controls a scanner device 208 to acquire image data. The scanner device 208 scans an original such as paper using an optical reading apparatus such as a CCD, and converts image information of the original into electrical signals.

A network control unit 209 controls a network I/F such as a NIC (Network Interface Card) 210 to perform sending and receiving of image data with respect to a network such as a LAN. The network control unit 209 also controls a modem 211 to transmit and receive images to and from a telephone line to provide a FAX function.

The storage 213 is a non-volatile memory such as a HDD with respect to which both reading and writing can be performed. Control programs for controlling the overall system, and various application programs and scanned image data and the like are stored in the storage 213. The storage 213 also stores user information and job history information in addition to various data. A storage control unit 212 controls the storage 213.

An input control unit 214 inputs an operation instruction of a user from an input device 215 such as a touch panel or a hard key. A display control unit 216 controls a display device 217 such as an LCD or a CRT to display an operations screen to a user. The input control unit 214, the input device 215, the display control unit 216, and the display device 217 comprise an operation unit 218.

The information processing apparatus 101 is described according to FIG. 2 as an example of an information processing apparatus, and the information processing apparatus 102 has a similar configuration as the information processing apparatus 101. However, since the information processing apparatus 102 does not have a FAX function, the information processing apparatus 102 is not equipped with the modem 211.

Figure 3:
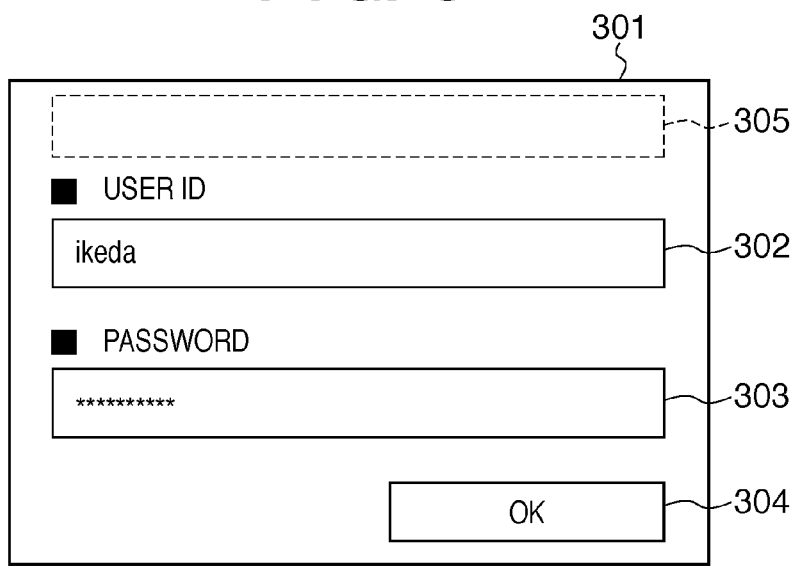
FIG. 3 is a view that illustrates an example of an operations screen of the information processing apparatus according to the first embodiment.
Figure 4:
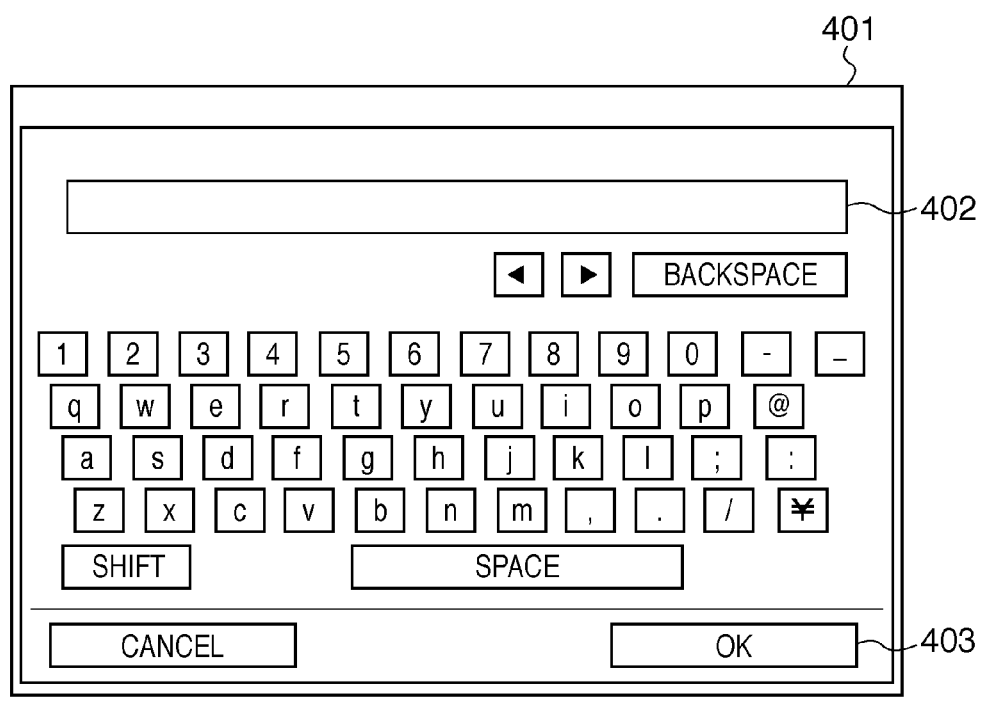
FIG. 4 is a view that illustrates an input screen of a software keyboard.

FIG. 3 is a view that illustrates an example of an operations screen of an information processing apparatus according to the first embodiment. A screen 301 shown in FIG. 3 is a screen that accepts input of authentication information to perform user authentication. When a user ID input field 302 is designated by a user to input a user ID, a software keyboard 401 as shown in FIG. 4 is displayed. The user operates the group of keys of the software keyboard 401 to input a user ID. The input contents are displayed in an input character string display label 402. Thereafter, when the user selects an OK button 403, the software keyboard 401 closes and the input contents are reflected in the user ID input field 302.

Returning to FIG. 3, a password input field 303 is used to input a password with respect to the user ID that has been input to the user ID input field 302. When the user designates the password input field 303, similarly to the user ID input field 302, the software keyboard 401 is displayed and the user can input a password.

However, "*" symbols are displayed in accordance with the number of input characters in the password input field 303 and the input character string display label 402 on the software keyboard 401 that is displayed when the field 303 is designated, to thereby mask the input contents.

When the OK button 304 is selected by the user, the contents input to the user ID input field 302 and the password input field 303 are confirmed, and authentication processing is performed. In this case, if authentication is successful, the screen transitions to a screen 501 shown in FIG. 5 that is described later. If the user authentication fails, only an error message such as "Input information is incorrect." is displayed in the message label 305 and the screen does not transition.

Figure 5:
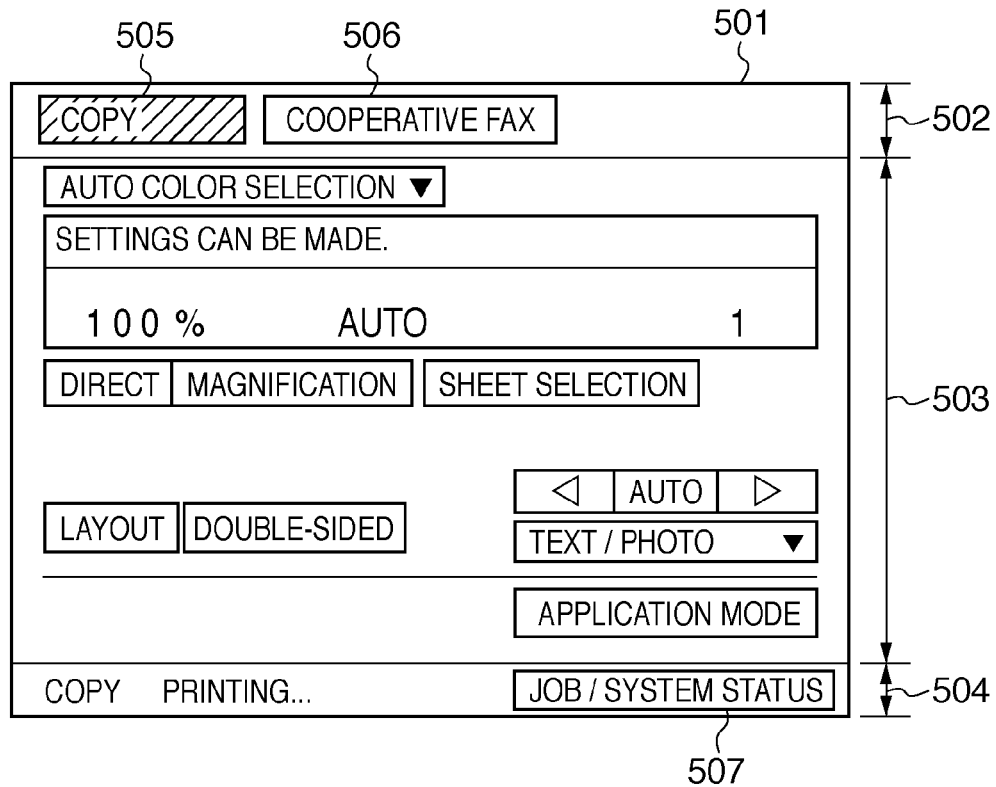
FIG. 5 is a view that illustrates an example of an operations screen of the information processing apparatus according to the first embodiment.

FIG. 5 is a view that illustrates an example of an operations screen of the information processing apparatus according to the first embodiment. As shown in FIG. 5, a screen 501 is divided into three regions consisting of a tab region 502, a main region 503, and a status display region 504. The example shown in FIG. 5 is an operations screen of the information processing apparatus 102.

The tab region 502 is a region in which tabs are displayed in accordance with the functions that can be used. A copy tab 505 is designated when selecting a copy function. In the example shown in FIG. 5, a state in which the copy function is selected is shown, and the copy tab 505 is displayed in an inverted manner.

A cooperative FAX tab 506 is designated when selecting a cooperative FAX function. In this case, the term "cooperative FAX function" refers to a function that scans an original at the information processing apparatus 102 to create a document, and transmits the created document using the FAX function of the information processing apparatus 101. When the cooperative FAX tab 506 is designated, the screen transitions to a screen 601 shown in FIG. 6 that is described below. On the screen 601, a screen of the cooperative FAX function is displayed in the main region 503. At this time, the inverted display of the copy tab 505 is cancelled, and the cooperative FAX tab 506 is displayed in an inverted manner instead.

The main region 503 is a region that displays a screen of the function that is selected in the tab region 502. Although a state in which the copy function is selected is shown in the example illustrated in FIG. 5, a description regarding the display contents of the main region 503 when the copy function is displayed is omitted here.

Figure 19:
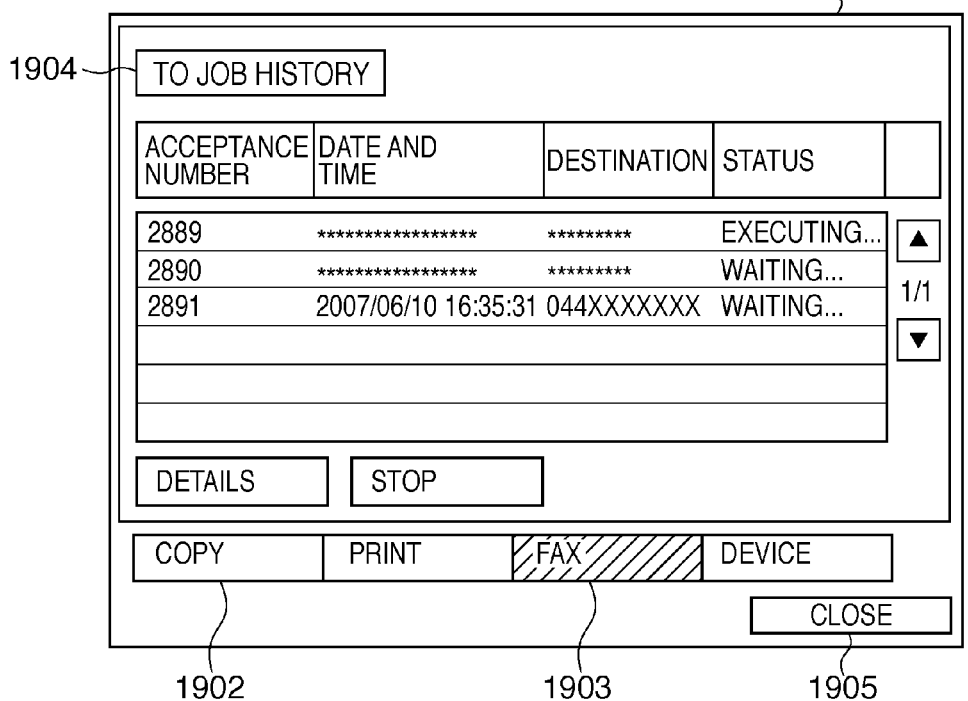
FIG. 19 is a view that illustrates an example of an operations screen of the information processing apparatus 101.

The status display region 504 is a region that displays a character string that shows the status of the device or a job that is being executed. When a Job/System Status button 507 is designated, the screen transitions to a screen 1901 that displays the status of a job or system as shown in FIG. 19 that is described later.

The respective screens shown in FIG. 3 and FIG. 4 are also displayed in a similar manner on the information processing apparatus 101. However, the cooperative FAX tab 506 is not displayed. At the same position, a tab (FAX tab) for selecting a FAX function is displayed. A detailed description thereof is omitted herein.

Figure 6:
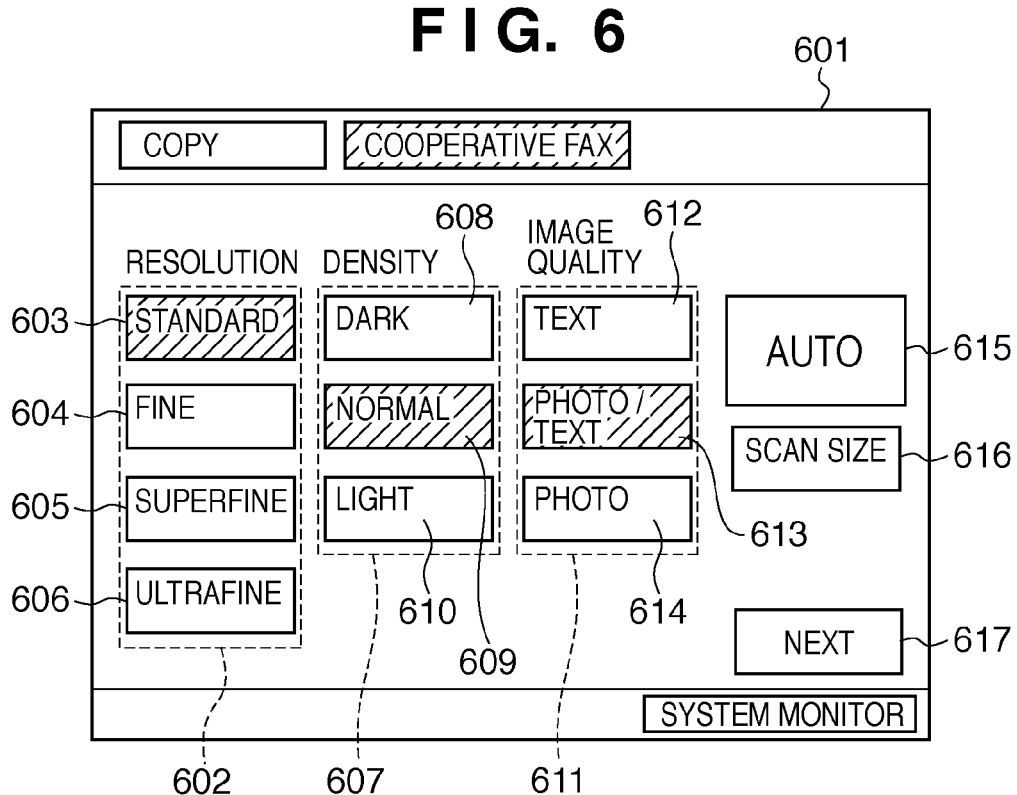
FIG. 6 is a view that illustrates an example of an operations screen when a cooperative FAX function is selected.

FIG. 6 is a view that illustrates an example of an operations screen when the cooperative FAX function has been selected. A screen of the cooperative FAX function is displayed in the main region 503. The screen 601 is a screen for designating settings relating to processing to read an original that is executed at the information processing apparatus 102.

A resolution selection area 602 is a portion in which a user selects a resolution to be used when reading an original. When a Standard button 603 is selected on this screen, a resolution of 200×100 dpi is set. Similarly, when a Fine button 604 is selected a resolution of 200×200 dpi is set, when a Superfine button 605 is selected a resolution of 200×400 dpi is set, and when an Ultrafine button 606 is selected a resolution of 400× 400 dpi is set. The Standard button 603, Fine button 604, Superfine button 605, and Ultrafine button 606 operate in a toggle manner with respect to each other, and are displayed in an inverted manner when selected.

A density selection area 607 is a portion in which a user selects the density to be used when reading an original. When a Dark button 608 is selected, the density is set so as to read the original with a high density. When a Normal button 609 is selected, the density is set so as to read the original in a normal mode. When a Light button 610 is selected, the density is set so as to read the original with a low density. The Dark button 608, Normal button 609, and Light button 610 operate in a toggle manner with respect to each other, and are displayed in an inverted manner when selected.

An image quality selection area 611 is a portion in which a user selects an image quality to be used when reading an original. When a Text button 612 is selected, the image quality is set so as to read the original as a text original. When a Text/Photo button 613 is selected, the image quality is set so as to read the original as an original in which text and a photograph are mixed. When a Photo button 614 is selected, the image quality is set so as to read the original as a photograph original. In this case, the Text button 612, Text/Photo button 613, and Photo button 614 operate in a toggle manner with respect to each other, and are displayed in an inverted manner when selected.

A Scan Size button 616 is used to set the size of an original. When the user designates the Scan Size button 616, a screen (unshown) for setting the size of an original is displayed, and the user can set the size of the original. An original size label 615 displays the size of an original that has been set by the means of the Scan Size button 616. A Next button 617 confirms the settings of the screen 601 and transitions to a screen 701 shown in FIG. 7 that is described below.

Figure 7:
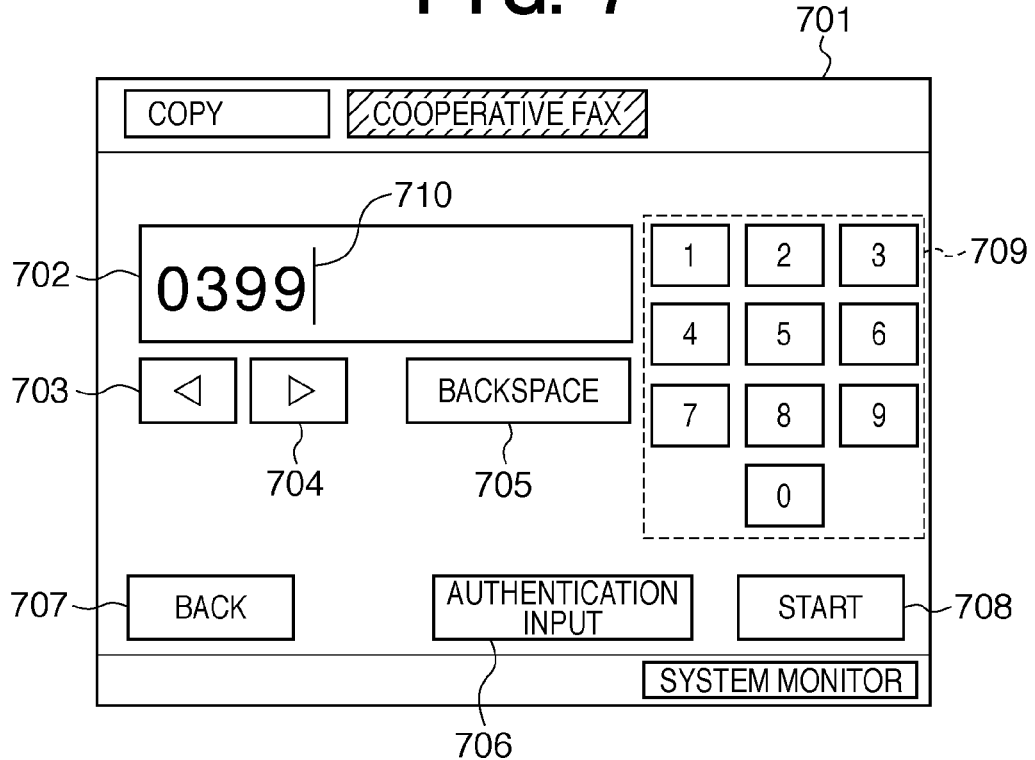
FIG. 7 is a view that illustrates an example of an operations screen which is transitioned to when "Next" is pressed on the operations screen shown in FIG. 6.

FIG. 7 is a view that illustrates an example of an operations screen that is transitioned to when "Next" is pressed on the operations screen shown in FIG. 6. In this case, a screen 701 is a screen on which a user inputs a destination number of the FAX destination. A FAX number label 702 displays a FAX number that the user has input. The FAX number is input by operating a ten-key keypad 709. A caret 710 is displayed in the FAX number label 702. A numerical value designated by the ten-key keypad 709 is inserted immediately after the caret 710.

A left button 703 and a right button 704 are used to move the position of the caret 710. When the left button 703 is pressed, the caret 710 is moved one space to the left side. When the right button 704 is pressed, the caret 710 is moved one space to the right side. A Backspace button 705 is used to erase a numerical value that appears immediately before (to the immediate left of) the caret 710.

An Authentication Input button 706 is used for inputting authentication information to transmit to the information processing apparatus 101 that is the cooperation destination when executing a cooperative job. When the Authentication Input button 706 is designated, the screen transitions to a screen 901 shown in FIG. 9 that is described later. Authentication information to be transmitted to the information processing apparatus 101 can be input on the screen 901.

A Back button 707 is used to transition the screen to the screen 601. A Start button 708 is used to designate the start of a cooperative job. When the Start button 708 is designated, the information processing apparatus 102 transmits authentication information of the user that is being authenticated to the information processing apparatus 101.

However, the aforementioned authentication information is transmitted when authentication information is input on the screen 901. The information processing apparatus 101 performs authentication processing upon receiving the authentication information. If the authentication processing result indicates that the authentication is successful, the screen transitions to a screen 801, and reading of the original starts. If the authentication fails, the screen transitions to a screen 1001 shown in FIG. 10 that is described later.

Figure 8:
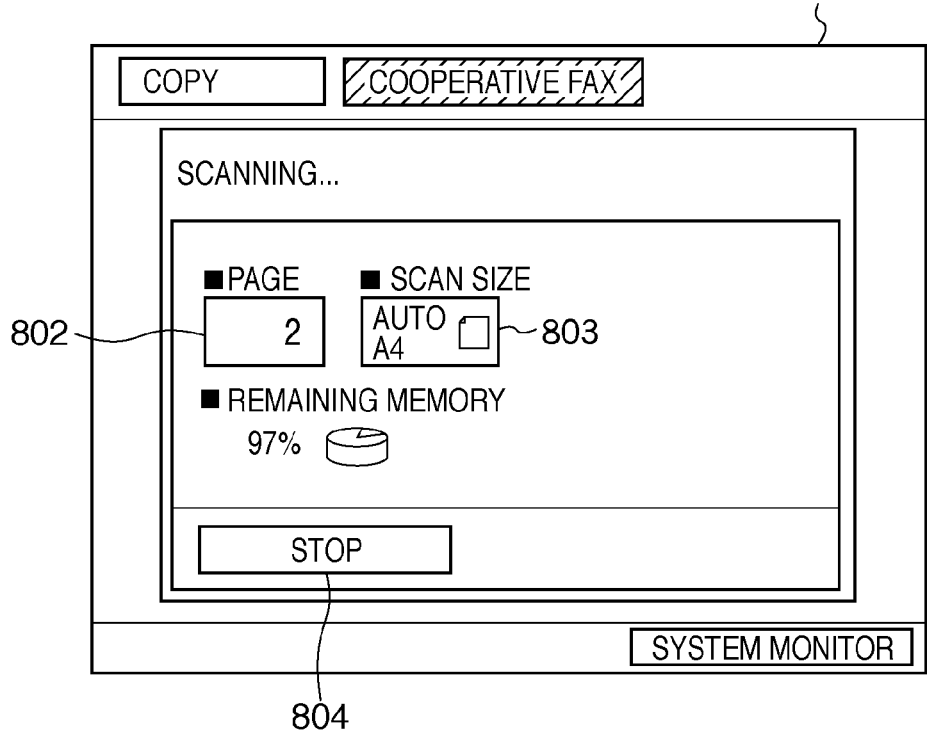
FIG. 8 is a view that illustrates an example of an operations screen which is transitioned to when "Start" is pressed on the operations screen shown in FIG. 7.

FIG. 8 is a view that illustrates an example of an operations screen that is transitioned to when "Start" is pressed on the operations screen shown in FIG. 7. The screen 801 is a screen that is displayed during execution of processing to read an original.

A Page label 802 displays the number of pages of an original that is read. The Page label 802 counts up the number of pages for each original that is read. A Scan Size label 803 displays the size of an original to be read. A scan size of an original that has been set by the Scan Size button 616 is displayed in the Scan Size label 803.

A Stop button 804 is used to stop processing to read an original as well as FAX transmission processing that is performed by the information processing apparatus 101 after the processing to read an original. When the Stop button 804 is designated, the processing is stopped and the screen returns to the screen 601.

Next, when reading of the original ends, the screen 801 automatically closes and returns to the screen 601. Further, the information processing apparatus 102 sends the document that has been read and a FAX transmission setting (FAX number) to the information processing apparatus 101, and designates FAX transmission processing.

Figure 9:
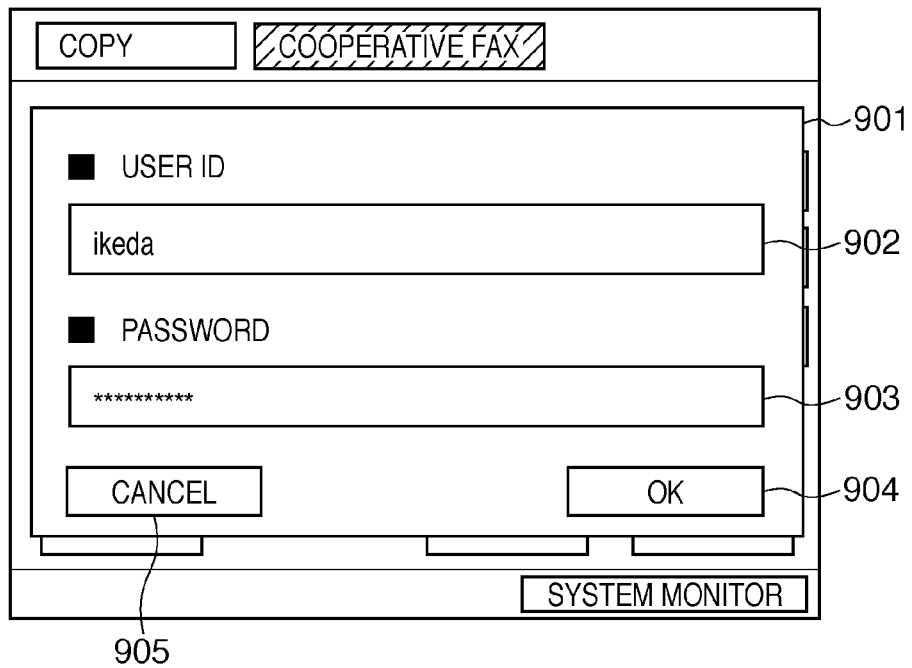
FIG. 9 is a view that illustrates an example of an operations screen which is transitioned to when "Authentication Input" is pressed on the operations screen shown in FIG. 7.

FIG. 9 is a view that illustrates an example of an operations screen that is transitioned to when the user presses "Authentication Input" that is shown in FIG. 7. The screen 901 is a screen on which a user inputs authentication information to be sent to the information processing apparatus 101 when executing a cooperative job.

A user ID input field 902 is used to input a user ID. When the user ID input field 902 is designated, the above described software keyboard 401 (FIG. 4) is displayed and the user can input a user ID. A password input field 903 is for inputting a password with respect to a user ID that has been input in the user ID input field 902. When the password input field 903 is designated, the above described software keyboard 401 is displayed and the user can input a password.

When an OK button 904 is designated, the information input to the user ID input field 902 and the password input field 903 is confirmed, and the screen returns to the screen 701.

When a Cancel button 905 is designated, input of the authentication information is cancelled. When the Cancel button 905 is pressed, the screen returns to the screen 701. In this case, when executing a cooperative job, the authentication information of the user that is being authenticated at the information processing apparatus 102 is sent to the information processing apparatus 101.

Figure 10:
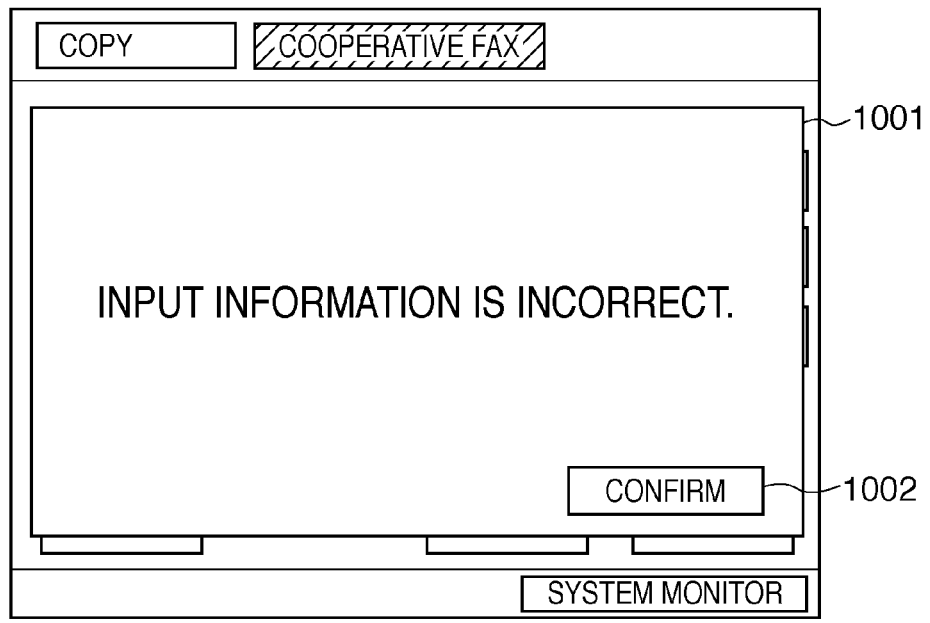
FIG. 10 is a view that illustrates an example of a screen that is displayed when authentication processing fails at an information processing apparatus 101 when executing a cooperative job.

FIG. 10 is a view that illustrates an example of a screen that is displayed in a case where authentication processing at the information processing apparatus 101 failed when executing a cooperative job. According to this example, a case is illustrated in which authentication processing using authentication information input at the screen 901 failed at the information processing apparatus 101.

When a Confirm button 1002 shown on a screen 1001 is designated, the setting contents of the screen 601 and the screen 701 are discarded and the screen returns to the screen 601.

Next, a method of managing user information stored in the storage 213 of the information processing apparatus 101 and the information processing apparatus 102, respectively, is described using FIG. 11.

FIG. 11 is a view that shows a configuration of a user management table according to the first embodiment. The user management table 1101 shown in FIG. 11 is a table that stores authentication information as user information. In this case, a user ID 1102, a password 1103, and a classification 1104 constitute a single record, and correspond to a single user account.

The user ID 1102 is a user ID that is unique to the information processing apparatuses 101 and 102, respectively. The password 1103 is a password with respect to the user ID 1102. The classification 1104 is data that indicates the classification of the user account. Normally, "0" is stored in the case of a user account. When executing a cooperative job, "1" is stored at the information processing apparatus 101 in the case of a user account that is created based on authentication information received from the information processing apparatus 102.

Figure 12:
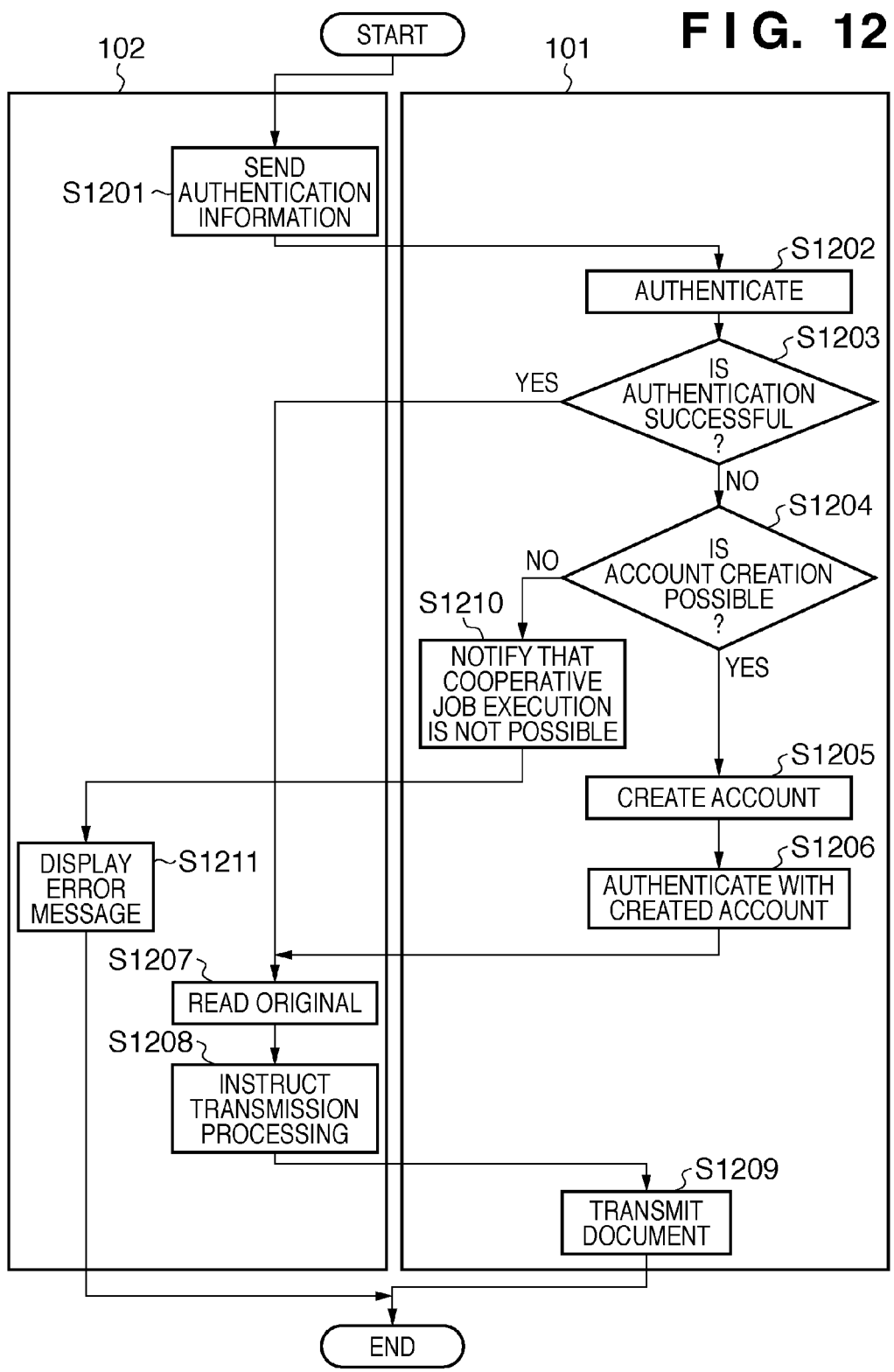
FIG. 12 is a flowchart that illustrates processing procedures for a cooperative job (cooperative FAX) according to the first embodiment.

Next, the processing procedures of a cooperative job (cooperative FAX) performed using the information processing apparatus 101 and the information processing apparatus 102 are described using FIG. 12.

FIG. 12 is a flowchart that shows the processing procedures of a cooperative job (cooperative FAX) according to the first embodiment. The left side in FIG. 12 shows processing performed at the information processing apparatus 102 that is the cooperation origin. The right side in FIG. 12 shows processing performed at the information processing apparatus 101 that is the cooperation destination. The respective processing flows in FIG. 12 illustrate the flow of processing in which the CPU 201 of the respective information processing apparatuses loads a program stored in the ROM 202 to the RAM 204 and executes the program. When the Start button 908 on the screen 901 of the information processing apparatus 102 is pressed, the information processing apparatus 102 sends the authentication information of the user that is being authenticated to the information processing apparatus 101 (S1201). The term "authentication information of the user that is being authenticated" refers to authentication information input on the screen 901 on the operation unit 218 of the information processing apparatus 102.

When the information processing apparatus 101 receives authentication information, the information processing apparatus 101 performs authentication processing based on the received authentication information (S1202). This processing is processing that retrieves a record (user account) that matches a user ID and a password included in the received authentication information from the user management table 1101 of the information processing apparatus 101. More specifically, the processing determines whether or not a user account that is the same as the received authentication information exists at the information processing apparatus 101. In this case, if a matching record exists it is determined that the authentication is successful, and if a matching record does not exist it is determined that the authentication has failed (S1203).

When the determined result is that the authentication has failed (NO in S1203), the processing determines whether or not it is possible to create a user account based on the received authentication information (S1204). In this case, it is determined that it is possible to create a user account when the number of user accounts that can be newly created does not exceed a predetermined number.

When it is determined in the aforementioned step S1204 that creation of an account is possible, a user account is newly created based on the received authentication information (S1205). This processing adds a new record to the user management table 1101, and stores the user ID and the password included in the received authentication information in the user ID 1102 and the password 1103 of the new record, respectively. The processing also stores "1" in the classification 1104 of the new record.

Next, authentication is performed using the user account created in S1205 (S1206). The authentication in S1206 is successful, and a state is entered in which the cooperative job can be executed. The information processing apparatus 102 then reads an image on an original using the scanner device 208 to create a document (image data) (S1207). Reading of the original is performed based on the contents set using the screen 601.

Next, the information processing apparatus 102 instructs the information processing apparatus 101 to execute transmission processing (S1208). At this time, the information processing apparatus 102 sends the read document and setting information (FAX number) relating to transmission that has been set using the screen 701 to the information processing apparatus 101. When the information processing apparatus 101 receives the transmission processing instruction, the information processing apparatus 101 transmits the received document in accordance with the setting information using the modem 211 (S1209).

In contrast, when it is determined that account creation is not possible in the aforementioned S1204, the information processing apparatus 101 notifies the information processing apparatus 102 that execution of the cooperative job is not possible (S1210). Based on this notification, the information processing apparatus 102 displays the screen 1001 and ends the processing (S1211). On the other hand, when authentication is successful in the aforementioned S1203 the processing advances to S1207 to execute the cooperative job as described above. The status and history of the cooperative job are managed by means of the user account (including an account generated in S1205) included in the authentication information received in S1202.

Thus, in a case in which a user account with authentication information that is the same as authentication information of the user that is being authenticated at the cooperative information source processing apparatus does not exist at the destination cooperative information processing apparatus, a user account is created based on the relevant authentication information at the destination cooperative information processing apparatus. Subsequently, authentication using the created user account is successful, and the cooperative job is executed. Thus, it is not necessary to previously register a user account in both the cooperative information source processing apparatus and the destination cooperative information processing apparatus in order to execute a cooperative job, and complications with respect to management of user accounts can be reduced.

[Second Embodiment]

Next, a second embodiment of the present invention is described in detail while referring to the drawings. According to the first embodiment, when a user account that is being authenticated at a cooperative information source processing apparatus does not exist in the destination cooperative information processing apparatus, a user account is created based on the authentication information and a cooperative job is executed. According to the second embodiment, in addition to the processing of the first embodiment, creation of a user account is restricted by the destination cooperative information processing apparatus performing authentication with respect to the cooperative information source processing apparatus.

Figure 13:
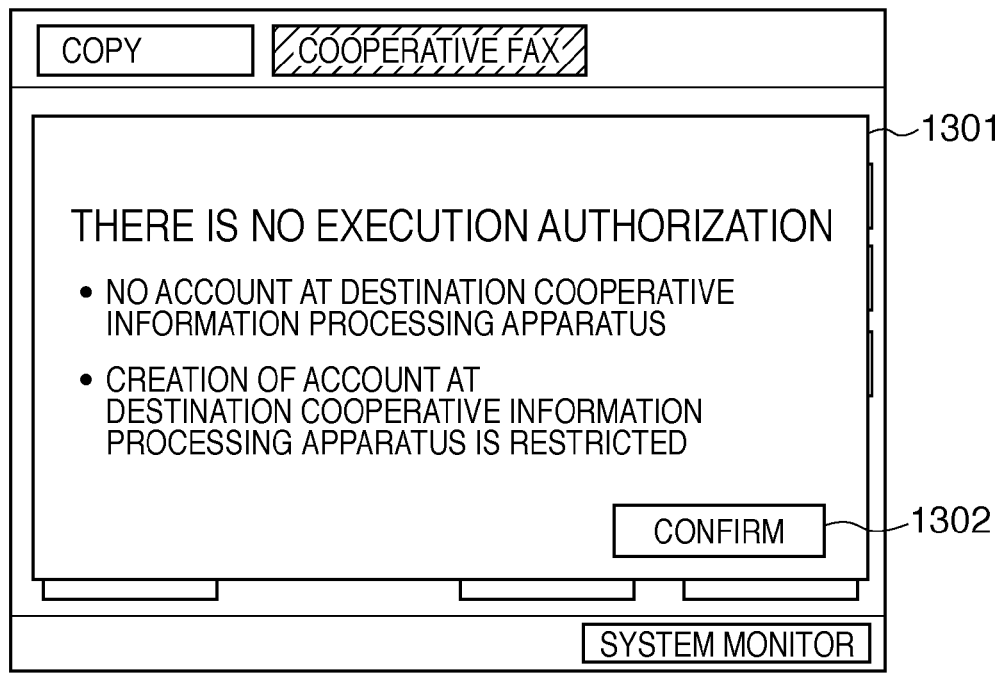
FIG. 13 is a view that illustrates an example of an operations screen of an information processing apparatus according to a second embodiment.

FIG. 13 is a view that illustrates an example of an operations screen of an information processing apparatus according to the second embodiment. A screen 1301 shown in FIG. 13 is displayed in a case where although it is necessary to create a user account at the information processing apparatus 101 in order to execute a cooperative job after the Start button 708 is pressed at the information processing apparatus 102, the information processing apparatus 102 is an object for restriction of user account creation.

When the user presses a Confirm button 1302 on the screen 1301, the screen 1301 closes, the contents set with the screen 601 and the screen 701 are discarded, and the screen transitions to the screen 601.

Figure 14:
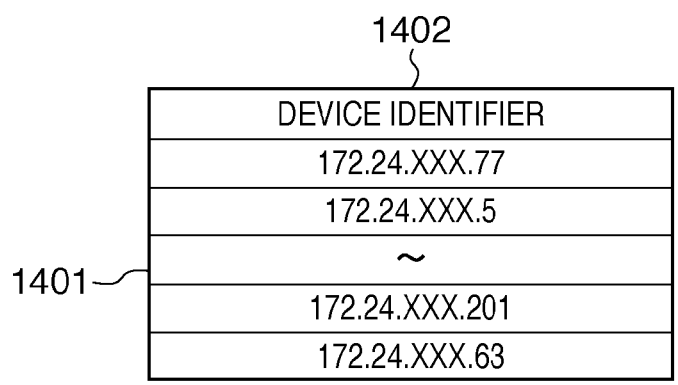
FIG. 14 is a view that illustrates the configuration of information of a cooperative information source processing apparatus at which it is possible to create a user account that is stored in a storage 213 of the information processing apparatus 101.

FIG. 14 is a view that illustrates the configuration of information of a cooperative information source processing apparatus at which it is possible to create a user account that is stored in the storage 213 of the information processing apparatus 101. A cooperation device information table 1401 stores information of cooperative information source processing apparatuses at which a user account may be created when executing a cooperative job.

A device identifier 1402 is an identifier of a cooperative information source processing apparatus at which a user account may be created. Although an IP address is stored as an identifier in this case, the identifier may be any information that can uniquely identify an information processing apparatus connected by a network with the information processing apparatus 101, such as a MAC address or a device serial number.

The cooperation device information table 1401 can be edited using an operations screen (unshown) of the information processing apparatus 101, and a cooperative information source processing apparatus at which a user account may be created is previously set at a time of executing a cooperative job.

Next, processing procedures for executing a cooperative job using the information processing apparatus 101 and the information processing apparatus 102 according to the second embodiment are described. The processing procedures for cooperative job execution according to the second embodiment are the same as shown in the flowchart illustrated in FIG. 12 according to the first embodiment. Hereunder, only differences from the processing procedures according to the first embodiment are described.

First, in S1201, in addition to authentication information, an identifier of the information processing apparatus 102, such as an IP address of the information processing apparatus 102, is sent. Next, in S1204, in addition to determining whether or not the number of user accounts that can be newly created exceeds an upper limit, it is determined whether or not the information processing apparatus 102 is a device at which it is possible to create a user account. This is processing that retrieves an identifier of the information processing apparatus 102 that is received from the information processing apparatus 102 from among the device identifiers 1402 of the cooperation device information table 1401. If the retrieval result indicates that the relevant line exists, it is determined that it is possible to create a user account. If the retrieval result indicates that the relevant line does not exist, it is determined that it is not possible to create a user account. If both conditions match, the processing proceeds to S1205.

According to the second embodiment, when the destination cooperative information processing apparatus cannot authenticate the cooperative information source processing apparatus, creation of a user account is restricted. For example, it is possible to prevent a user from instructing cooperative job from an information processing apparatus that does not have a transmission function which is installed in a department that handles classified information to another information processing apparatus that has a transmission function, and thereby prevent transmission of classified documents to outside. Thus, complications in management of user account can be reduced without any loss with respect to security.

[Third Embodiment]

Next, a third embodiment of the present invention is described in detail while referring to the drawings. According to the third embodiment, a method of managing a user account created when executing a cooperative job as described in the above embodiments at a destination cooperative information processing apparatus is described. Each information processing apparatus has a function that manages a job history for each function.

FIG. 15 is a view that illustrates the configuration of job history information of a FAX function that is stored in the storage 213 of the information processing apparatus 101. In this case, a single record of a FAX job history table 1501 corresponds to a single FAX job.

An acceptance number 1502 shown in FIG. 15 is an acceptance number of a FAX job, and is an identifier of a job that is issued when a job is executed. A status 1503 represents a completion status of a FAX job. When a job was completed normally, "OK" is stored as the status 1503, and when a job completed with an error, such as an unknown destination, "NG" is stored as the status 1503.

A completion date and time 1504 is a date and time that a FAX job was completed. A destination 1505 is a destination number for FAX transmission. An owner 1506 is a user ID of a user that issued a FAX job.

In this connection, an upper limit is set with respect to the number of items recorded in the FAX job history. In a case in which the upper limit has been reached, when a new job ends, a new history is stored after deleting (erasing) the oldest history. Job histories are also stored for the copy function at the information processing apparatus 101 using the same configuration as for the FAX function. A detailed description regarding the job histories of the copy function is omitted herein.

FIG. 16 is a view that illustrates the configuration of a user information table according to the third embodiment. In a user information table 1601 shown in FIG. 16, the user ID 1102, the password 1103, and the classification 1104 are the same as the corresponding items shown in FIG. 11 that is described according to the first embodiment.

A last job 1602 is information of a job that was last executed by a user with the relevant user ID 1102. The format thereof is "(job classification)_(acceptance number)". The job classification is a character string that indicates whether the last job was a copy job or a FAX job. The last job 1602 is updated each time a user executes a job at the information processing apparatus 101.

Figures 17, 18:
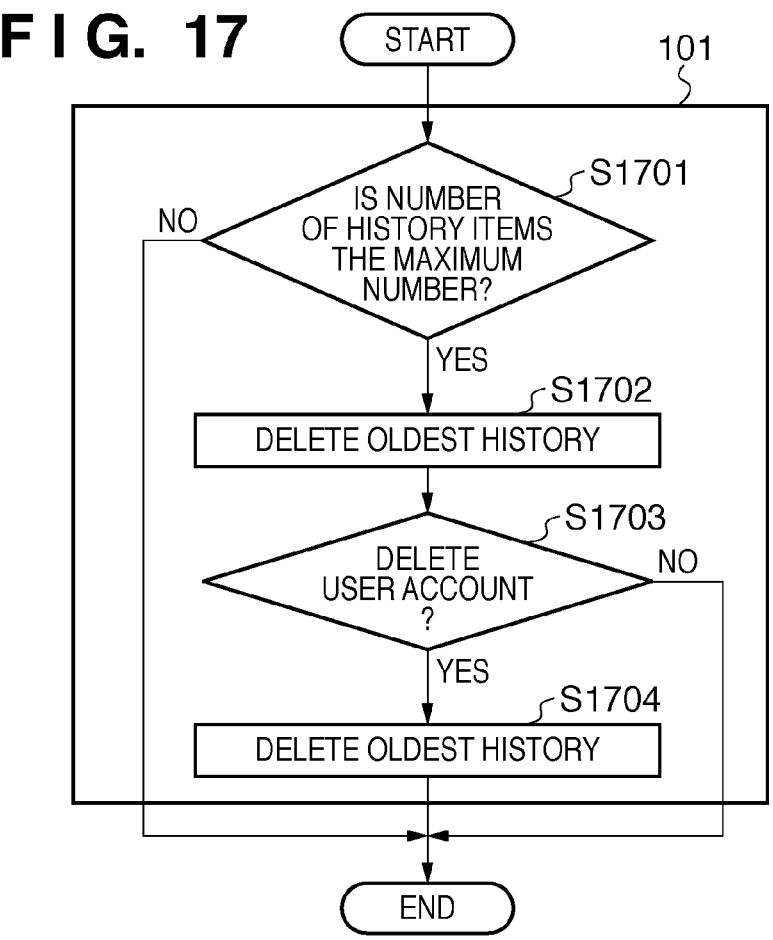
FIG. 17 is a flowchart that illustrates processing procedures for user account management in the information processing apparatus 101.
FIG. 18 is a view that illustrates the configuration of function use authorization information that is stored as a part of user information in the storage 213 of the information processing apparatus 101 and an information processing apparatus 102.

Next, processing procedures of user account management that manages a user account at the information processing apparatus 101 are described using FIG. 17. FIG. 17 is a flowchart that illustrates processing procedures of user account management at the information processing apparatus 101. The processing procedures are started when a copy job or a FAX job that includes a cooperative FAX job has ended at the information processing apparatus 101.

First, it is determined whether or not the number of job history items has reached a predetermined maximum number of items (S1701). In this case, if it is determined that the number of job history items has not reached a predetermined maximum number of items, the processing ends. However, if it is determined that the number of job history items has reached a predetermined maximum number of items, the oldest record is deleted from the job history items (S1702).

Next, it is determined whether or not to delete the user account corresponding to the owner 1506 of the history record that is deleted in S1702 (S1703). More specifically, a user corresponding to the user ID stored in the owner 1506 of the deleted history is retrieved from the user information table 1601. It is then determined whether or not a value of the last job 1602 of the retrieved user record matches the classification and the acceptance number 1502 of the deleted history record of the relevant job, and whether or not the classification 1104 is "1". In this case, if the relevant values match, it is determined that the user record (user account) is to be deleted, and if the relevant values don't match it is determined that the user record (user account) is not to be deleted.

In this case, if it is determined that the user record (user account) is to be deleted, the relevant user record (user account) is deleted (S1704) and the processing ends. If it is determined in S1703 that the user record (user account) is not to be deleted, the processing ends.

In this manner, in response to deletion of all the histories of jobs executed by a user with a user account created when executing a cooperative job, the user account in question is deleted. It is thereby possible to prevent a unilateral increase in user accounts for cooperative job execution, and further enhance the convenience with respect to management.

In some cases deletion of a job history is performed by a user operation or the like, and the same processing can be applied in those cases also.

[Fourth Embodiment]

Next, a fourth embodiment of the present invention is described in detail while referring to the drawings. Each information processing apparatus is configured such that authorization of the use of the functions thereof can be set for each user. According to the fourth embodiment, when executing a cooperative job, the aforementioned function use authorization is applied to a user account that has been created.

FIG. 18 is a view that illustrates the configuration of function use authorization information that is stored as one part of user information in the storage 213 of the information processing apparatus 101 and the information processing apparatus 102. In a function use authorization information table 1801, a single record corresponds to authorization information of a single user.

A user ID 1802 is an identifier (ID) of a user. A copy use authorization 1803 is a data item that indicates whether or not use of a copy function is authorized. A FAX use authorization 1804 is a data item that indicates whether or not use of a FAX function is authorized. Since the information processing apparatus 102 does not have a FAX function, the FAX use authorization 1804 is unnecessary when only utilizing the information processing apparatus 102 as a stand alone device. However, since it is possible to utilize a FAX function by cooperating with the information processing apparatus 101 to thereby utilize the FAX function thereof as a cooperative job, this item is managed as function use authorization information. A print use authorization 1805 is a data item that indicates whether or not use of a print function is authorized.

Any one of the values "0", "1", and "2" is stored in the copy use authorization 1803, the FAX use authorization 1804, and the print use authorization 1805. The meaning of each value is as follows.

"0": It is possible to execute a job, refer to a job status, and refer to a job history.

"1": It is not possible to execute a job or refer to a job status. It is possible to refer to a job history.

"2": It is not possible to execute a job, refer to a job status, or refer to a job history.

The function use authorization information table 1801 can be edited using an operations screen (unshown) of the information processing apparatus 101 and the information processing apparatus 102.

According to the fourth embodiment, in a case in which use of a copy function is set as prohibited for a user for which authentication succeeded at the information processing apparatus 101, the copy tab 505 is displayed with shading and cannot be selected. A screen displaying a copy function is also not displayed in the main region 503.

Further, when a setting is made such that use of a FAX function is prohibited for a user for which authentication succeeded, a FAX tab (unshown) is displayed with shading and cannot be selected. Furthermore, a screen (unshown) displaying a FAX function is also not displayed in the main region 503.

The information processing apparatus 102 is controlled in a similar manner, and the copy tab 505 and the cooperative FAX tab 506 are controlled so as to be displayed with shading in accordance with the function use authorization. Further, screens displaying the functions corresponding to the two tabs are not displayed in the main region 503.

FIG. 19 is a view that illustrates an example of an operations screen of the information processing apparatus 101. The screen 1901 is a screen that displays a list of uncompleted jobs for which the information processing apparatus 101 has issued an acceptance number. That is, the screen 1901 is a screen that displays job statuses. The screen 1901 is displayed when a user designates the Job/System Status button 507 on the screen 501. A detailed description of the screen 1901 is omitted herein.

A Copy button 1902 displays a list of uncompleted copy jobs when designated by a user. However, when the copy use authorization 1803 relating to a user for which authentication is established by the information processing apparatus 101 is "1" or "2", the Copy button 1902 is displayed with shading and cannot be designated.

A FAX button 1903 displays a list of uncompleted FAX jobs when designated by a user. However, when the FAX use authorization 1804 relating to a user for which authentication is established by the information processing apparatus 101 is "1" or "2", the FAX button 1903 is displayed with shading and cannot be designated.

When a To Job History button 1904 is designated, the screen transitions to a screen 2001 shown in FIG. 20 that is described below. A Close button 1905 closes the screen 1901 when designated by a user.

Figure 20:
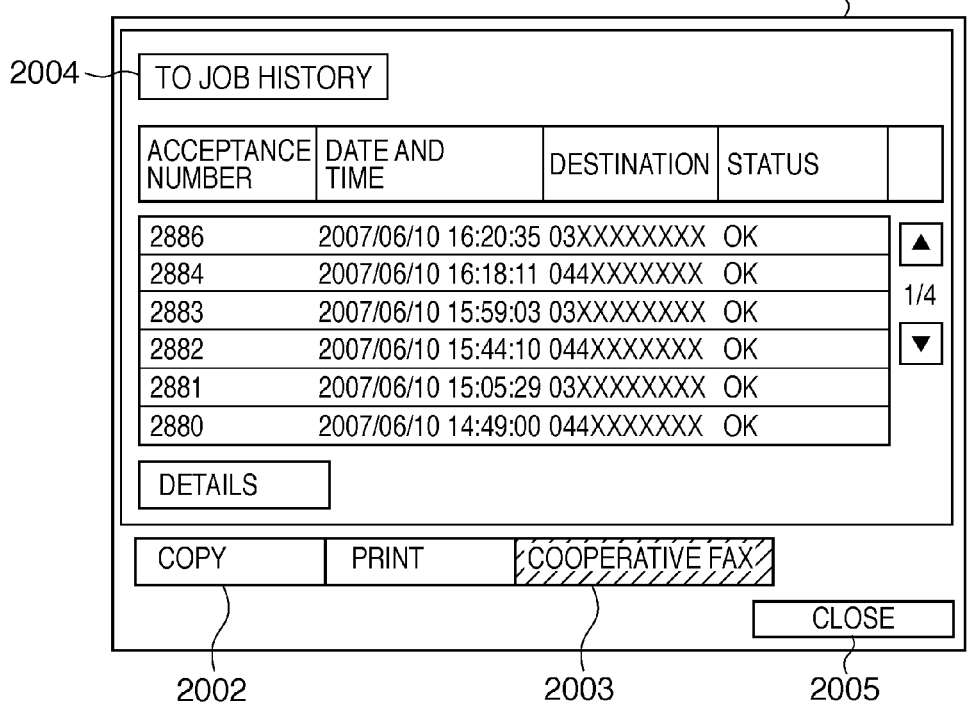
FIG. 20 is a view that illustrates an example of an operations screen of the information processing apparatus 101.

FIG. 20 is a view that illustrates an example of an operations screen of the information processing apparatus 101. The screen 2001 shown in FIG. 20 displays a list of jobs for which processing has been completed by the information processing apparatus 101, that is, a job history. The configuration of the screen 2001 is similar to that of the screen 1901 and a detailed description thereof is omitted here.

When designated, a Copy button 2002 displays a history of copy jobs for which processing has been completed by the information processing apparatus 101. However, when the copy use authorization 1803 relating to a user for which authentication is established by the information processing apparatus 101 is "2", the Copy button 2002 is displayed with shading and cannot be designated.

When designated, a FAX button 2003 displays a history of FAX jobs for which processing has been completed by the information processing apparatus 101. However, when the FAX use authorization 1804 relating to a user for which authentication is established by the information processing apparatus 101 is "2", the FAX button 2003 is displayed with shading and cannot be designated.

When a To Job Status button 2004 is designated, the screen transitions to the screen 1901. A Close button 2005 closes the screen 2001 when designated by a user.

Figure 21:
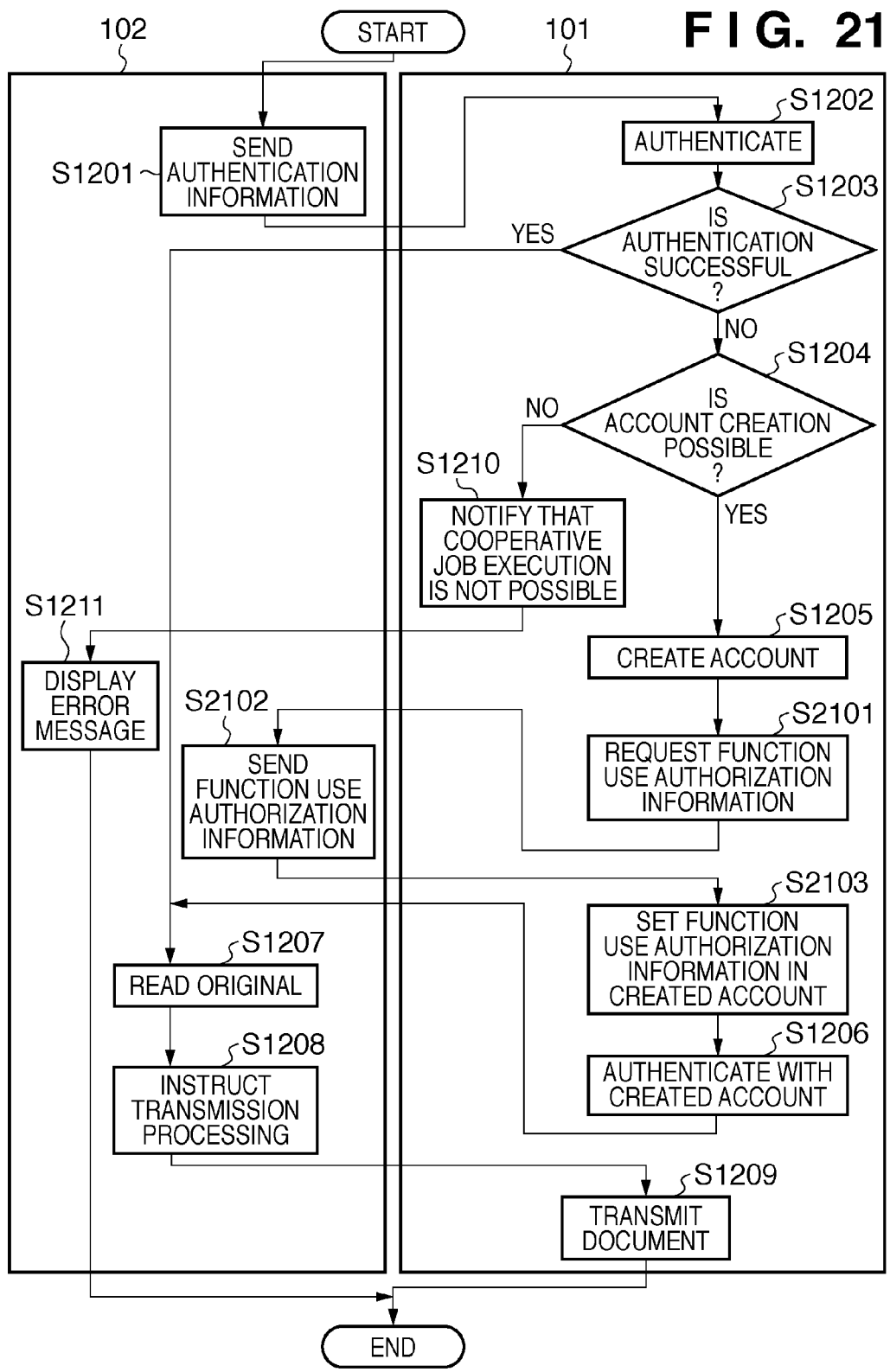
FIG. 21 is a flowchart that illustrates processing procedures for a cooperative job (cooperative FAX) according to a fourth embodiment.

Next, processing procedures of function use authorization management that manages authorization of the use of functions is described using FIG. 21.

FIG. 21 is a flowchart that illustrates processing procedures of a cooperative job (cooperative FAX) according to the fourth embodiment. The processing of S1201 to S1211 is the same as the processing shown in FIG. 12 that is described in the first embodiment.

Similarly to the first embodiment, after a cooperative job has been started at the information processing apparatus 102, in S1205 the information processing apparatus 101 creates a user account. Next, the information processing apparatus 101 sends a request to the information processing apparatus 102 for function use authorization information of the user account corresponding to the authentication information received in S1201 (S2101).

The information processing apparatus 102 retrieves the record of the user in question from the function use authorization information table 1801, and sends the record to the information processing apparatus 101 (S2102). As a result, the information processing apparatus 101 sets the function use authorization information received from the information processing apparatus 102 in the user account created in S1205 (S2103). This is processing that adds received function use authorization information (record) to the function use authorization information table 1801 of the information processing apparatus 101. The processing thereafter is the same as in the first embodiment.

As described above, function use restrictions for a destination cooperative information processing apparatus are previously set in a cooperative information source processing apparatus, and the function use restriction information is also applied to a user account created when performing destination cooperative information processing. It is thereby possible to appropriately perform function use authorization in relation to a user account created when executing a cooperative job also, and thus provide an information processing system that offers an even higher level of security. For example, it is possible to avoid a disadvantage whereby a function whose use is restricted to a user at a cooperative information source processing apparatus can be used when authentication with respect to the cooperative information source processing apparatus is established with a created user account.

Further, a configuration may be adopted so that, after completion of a cooperative job, a function use restriction of a user account that is created when executing the cooperative job is set to restrict the user to only reference to the job history. More specifically, in S1209, after an acceptance number is issued and document transmission is instructed, the FAX use authorization 1804 of the created user account is set to "1". Furthermore, the FAX use authorization 1804 is set to "2" if execution of a cooperative job is instructed again from the information processing apparatus 102 that authenticates the user in question.

It is thereby possible to prevent a user with a created user account from normally using the FAX function at the information processing apparatus 101 by means of a FAX function use authorization that was assigned for execution of a cooperative FAX. Accordingly, it is possible to manage function use authorization in a manner that is better adapted to management needs.

In this connection, naturally a configuration is adopted so as to encode information when highly confidential information such as authentication information is being exchanged by communication between a cooperative information source processing apparatus and a destination cooperative information processing apparatus.

Further, a communication protocol for communication between a cooperative information source processing apparatus and a destination cooperative information processing apparatus is not particularly prescribed, and as one example, it is possible to apply a Web service.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-063229, filed Mar. 16, 2009, hereby incorporated by reference herein in its entirety.

What is claimed is:

1. An information processing system that executes a cooperative job that is executed by cooperation between a plurality of information processing apparatuses that have an authentication function, comprising:
a source cooperative information processing apparatus comprising:
an authentication unit configured to perform authentication of a user using authentication information; and
a transmission unit configured to transmit, in a case where authentication of a user is performed by the authentication unit using the authentication information for executing a cooperative job, the authentication information used for the authentication to a destination cooperative information processing apparatus, and
the destination cooperative information processing apparatus comprising:
a creation unit configured to create account information based on authentication information transmitted by the transmission unit; and
a management unit configured to perform management of the cooperative job using account information created by the creation unit,
wherein the cooperative job includes that the destination cooperative information processing apparatus transmits image data transmitted from the source cooperative information processing apparatus using a facsimile transmitting function
wherein the management unit manages a history of the cooperative job,
wherein the destination cooperative information processing apparatus further comprises a deletion unit that deletes account information created by the creation unit, and
wherein in a case in which a history of the cooperative job that is managed by said management means is erased, the deletion unit deletes account information relating to the history of the cooperative job.

2. The system according to claim 1, wherein the destination cooperative information processing apparatus further comprises:
a determination unit configured to determine whether or not the destination cooperative information processing apparatus has a user account with the same authentication information as authentication information transmitted by the transmission unit, and
wherein when the determination unit determines that a user account with the same authentication information does not exist, the creation unit newly creates a user account as the account information based on the authentication information that is transmitted.

3. The system according to claim 1, wherein:
the source cooperative information source processing apparatus and the destination cooperative information processing apparatus comprise an authorization management unit that manages an authorization relating to use of its own apparatus with respect to account information;
when transmitting the authentication information with the transmission unit, the source cooperative information processing apparatus transmits authorization information showing an authorization of the authentication information that is managed with the authorization management unit to the destination cooperative information processing apparatus; and
the destination cooperative information processing apparatus manages an authorization relating to use of its own apparatus with respect to account information that is created by the creation unit in accordance with the authorization information transmitted by the source cooperative information processing apparatus, by means of the authorization management unit.

4. The system according to claim 3, wherein when the cooperative job is completed, the destination cooperative information processing apparatus edits an authorization with respect to account information created by the creation unit, by means of the authorization management unit.

5. The system according to claim 1, wherein:
the destination cooperative information processing apparatus further comprises a unit configured to authenticate the source cooperative information source processing apparatus; and when authentication is established by the means that authenticates, the creation unit creates account information based on the authentication information.

6. A processing method of an information processing system that executes a cooperative job that is executed by cooperation between a plurality of information processing apparatuses that have an authentication function, the method comprising:

using a source cooperative information processing apparatus to perform:

authenticating of a user using authentication information; and in a case where authentication of the user is performed for executing a cooperative job, transmitting the authentication information used for the authentication to a destination cooperative information processing apparatus;

the method further comprising using the destination cooperative information processing apparatus to perform:

creating account information based on authentication information transmitted from the source cooperative information processing apparatus that is the cooperation origin; and managing the cooperative job using the account information that is created, wherein the cooperative job includes that the destination cooperative information processing apparatus transmits image data transmitted from the source cooperative information processing apparatus using a facsimile transmitting function wherein managing the cooperative job includes managing a history of the cooperative job, wherein the destination cooperative information processing apparatus is further used to perform deleting of the created account information, and wherein in a case in which a history of the cooperative job that is managed is erased, account information relating to the history of the cooperative job is deleted.

* * * * *